United States Patent [19]
Henderson

[11] 3,835,288
[45] Sept. 10, 1974

[54] ARC-WELDING ELECTRODE

[76] Inventor: Harold R. Henderson, 152 Lenwood Dr., Lancaster, Ohio 43130

[22] Filed: Nov. 5, 1971

[21] Appl. No.: 196,050

[52] U.S. Cl............................ 219/145, 219/70
[51] Int. Cl............................. B23k 35/00
[58] Field of Search............ 219/70, 145, 146, 137; 117/202–206, 232; 138/141, 143, 145, 146,; 29/195 P

[56] References Cited
UNITED STATES PATENTS

| | | | |
|---|---|---|---|
| 2,410,461 | 11/1946 | Ronay | 219/146 |
| 2,462,463 | 2/1949 | Boot | 219/70 X |
| 2,510,960 | 6/1950 | Danitier | 219/146 |
| 2,552,176 | 5/1951 | Hummitzsch | 117/202 |
| 3,084,074 | 4/1963 | Wasserman et al. | 117/204 |
| 3,102,827 | 9/1963 | Kriewall et al. | 117/204 |
| 3,318,729 | 5/1967 | Siegel et al. | 219/146 X |
| 3,591,758 | 7/1971 | Clucas | 219/70 |

OTHER PUBLICATIONS

"Electrode, Cutting, Tubular, Steel, Covered" Military Specification, MIL–E–17764B, Apr. 1969, pp. 1–5.

*Primary Examiner*—J. V. Truhe
*Assistant Examiner*—Clifford C. Shaw
*Attorney, Agent, or Firm*—Barry Moyerman, Esq.

[57] ABSTRACT

An underwater electrode comprising generally cylindrical hollow-elongate electrically conducting substrate coated with an insulating material that is self-extinguishing when ignited by an arc. The coating is of a thickness and strength so that it burns away as the substrate is consumed forming a slight cone-shaped protective extension at the end of the substrate where the arc is struck to a workpiece. A preferred coating is a pre-catalyzed thermosettable epoxy resin placed on an uncoated substrate.

2 Claims, 2 Drawing Figures

PATENTED SEP 10 1974　　3,835,288
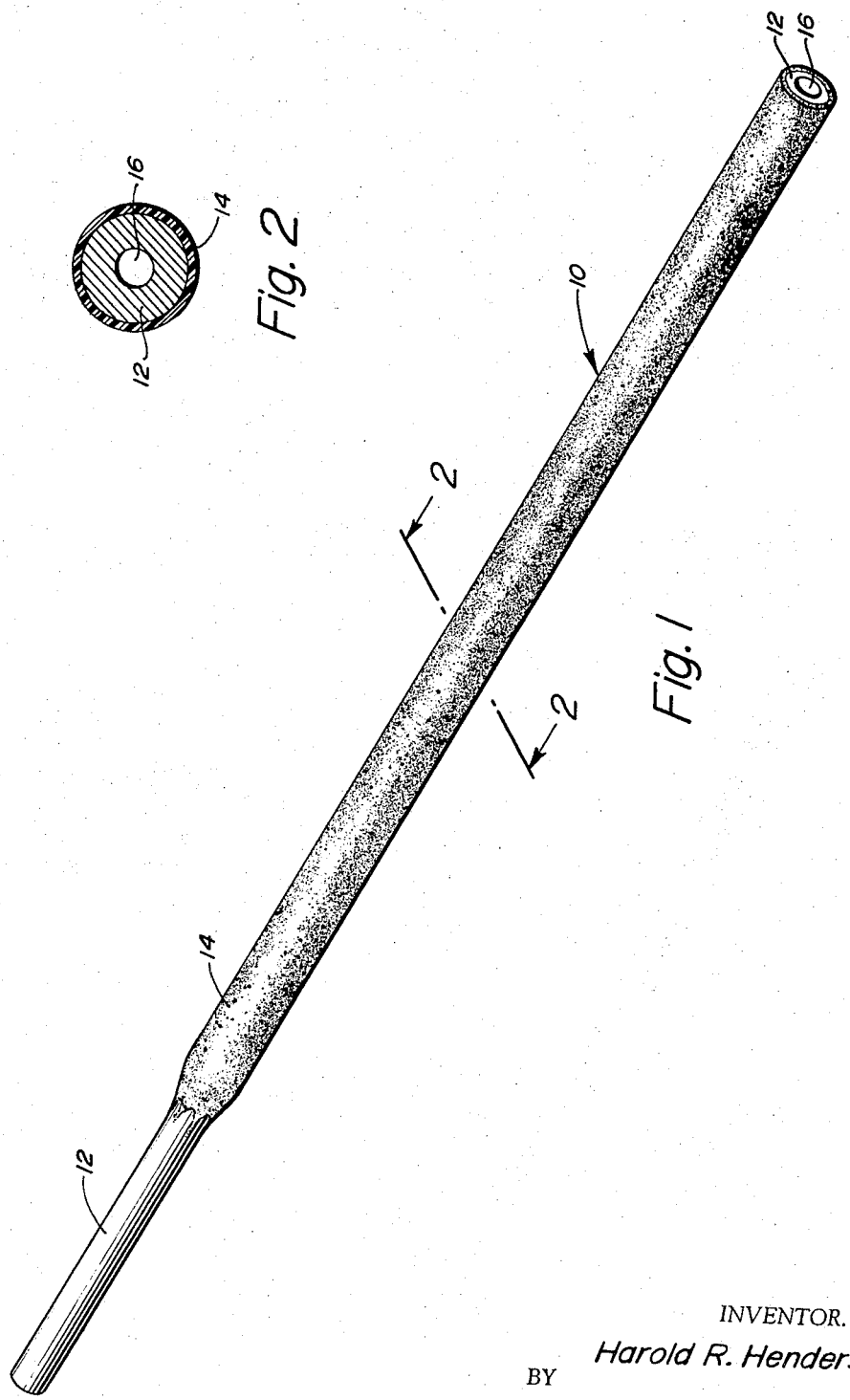
INVENTOR.
Harold R. Henderson
BY
James C. Simmons
ATTORNEY

ARC-WELDING ELECTRODE

BACKGROUND OF THE INVENTION

This invention pertains to coated electrodes used for cutting and welding underwater. Electrodes for use in arc cutting or welding underwater must have a coating to prevent contact of the operator with the current carried by the electrode and thereby avoiding injury to the operator. Coatings are also provided to prevent deterioration of the flux coating normally found on underwater electrodes.

Examples of prior art electrodes are shown in U.S. Pat. Nos. 2,421,594, 2,410,461, and 2,640,136. The first two patents disclose underwater electrodes wherein plastics were used, to saturate a waterproof covering or mixed with a flux respectively, to provide a suitable underwater electrode. The third patent discloses an electrode structure wherein the last layer is a layer of tape of the electrical insulating type. Until the electrode of the present invention, it has almost universally been the custom of users of underwater electrodes to wrap each electrode with tape prior to use to insure electrical insulation.

BRIEF DESCRIPTION OF THE INVENTION

In order to overcome the above-mentioned problems and to provide an improved electrode for underwater use, it has been discovered that if a uniform coating of a thermosettable epoxy resin is applied to the bare electrode substrate and cured, a durable, safe coating is achieved. The coating not only insulates the electrode but eliminates the need for a separate flux layer between it and the electrode substrate. While the preferred coatings are as described above other materials that will produce an abrasion resistant, waterproof, electrically insulating coating that also serves to crater the arc as with prior art flux coatings are within the scope of this invention.

Therefore, it is the primary object of this invention to provide an improved, coated electrode for arc cutting and welding underwater.

It is another object of this invention to provide a coated electrode for arc cutting and welding underwater that does not need a separate flux layer.

It is yet another object of this invention to provide an improved, coated electrode.

It is still a further object of this invention to provide an underwater electrode with a strong, abrasion-resistant coating.

It is still another object of this invention to provide an underwater electrode with a coating that will not deteriorate in aqueous environments.

It is also an object of this invention to provide a coated electrode wherein the coating is electrically insulating.

BRIEF DESCRIPTION OF THE DRAWING

FIG. 1 is an isometric view of an electrode according to the invention.

FIG. 2 is a cross-section taken along line 2—2 of FIG. 1.

DETAILED DESCRIPTION OF THE PREFERRED EMBODIMENT

There is shown in FIG. 1 an electrode 10 consisting of an electrically conducting substrate 12 and a coating 14. As shown in FIG. 2, the substrate 12 has a generally circular cross-section with a generally circular central bore 16. The bore 16 extends for the entire length of the electrode 10 in order to admit a gas such as oxygen to the arc when the electrode is in use. One end of the electrode 10 has the coating removed as shown in FIG. 1 so that the substrate 12 may be gripped in the torch (not shown) to receive the electrical current for striking and maintaining the arc. Only that portion of the coating 14 is removed where the electrode is gripped inside a conventional torch.

The coating 14 is of a thermosettable epoxy resin and is applied directly over the substrate 12. It has been discovered that epoxy resins of the type such as sold by Michigan Chrome and Chemical Company under the trade designation MICCRONTYPE 650 EPOXY are ideally suited for coating electrodes for underwater cutting and welding operations.

The preferred coating when in the cured condition exhibits the following physical properties:

| | |
|---|---|
| Specific Gravity | 1.6 |
| Hardness (Shore D) | 90–100 |
| Moisture Absorption (Per A.S.T.M.–D–570–24 Hr. Immersion) | 0.19% |
| Impact Strength (One pound ball at four feet per Army-Navy Specification Ar–D–1) | Indent Only |
| Flame Resistance | Self-Extinguishing |

The coatings also exhibit the following electrical properties:

| | Cycles per second | | | | |
|---|---|---|---|---|---|
| | $10^2$ | $10^3$ | $10^4$ | $10^5$ | $10^6$ |
| Dielectric Constant (A.S.T.M. D 150 at 77°F) K | 4.45 | 4.40 | 4.43 | 4.28 | 4.99 |
| Dissipation Factor (A.S.T.M. D 150 at 77°F) | 0.002 | 0.004 | 0.006 | 0.010 | 0.009 |
| | Temperature | | | | |
| | 77°F | 150°F | 200°F | 300°F | |
| Volume Resistivity (A.S.T.M. D–257) | $6.7 \times 10^{15}$ | $4.5 \times 10^{13}$ | $5.5 \times 10^{11}$ | $3.9 \times 10^7$ | |

Surface resistivity according to A.S.T.M. D–257 for a conditioned specimen at 77°F is $2.8 \times 10^{12}$ ohms/cm$^2$ and after immersion in water for 24 hours $2.8 \times 10^9$ ohms/cm$^2$. After immersion in water for 24 hours the dielectric constant and dissipation factor at $10^6$ cycles per second were 4.20 and 0.012 respectively.

The dielectric strength of a 10 to 20 mil thick coating was found to be 550–700 volts/mil according to A.S.T.M. D–149.

When coatings of this type are applied at a thickness of between 0.0165 and 0.0287 of an inch on a 0.3125 diameter electrode as the conducting substrate, which is usually a ferrous metal or alloy with a ferrous base, melts away the coating forms a crater which surrounds and serves to constrict and direct the arc. Thus the coating replaces a function normally fulfilled by the flux coating in prior art electrodes. The coating is impervious to water and will not deteriorate if left exposed to the atmosphere. This is especially true in salt water enviroments.

Electrodes according to the present invention were prepared and tested under actual field conditions. Various coating thicknesses were used in the test and a commercial (flux coated and taped) underwater electrode was as a comparison standard; the averaged results of these tests are set out in Table I.

TABLE I

| Electrode | Coating Thickness (in.) | Cut[1] | Time[2] |
|---|---|---|---|
| 1 | 0.0110 | 1.51 | 31.1 |
| 2 | 0.0165 | 1.67 | 75.1 |
| 3 | 0.0215 | 1.71 | 61.9 |
| 4 | 0.0265 | 1.44 | 54.3 |
| 5 | Standard | 1.23 | 30.5 |

(1) Inches cut per inch of electrode
(2) Inches cut per minute

The results of Table I indicate that the new coated electrodes are superior to the standard flux coated underwater electrode.

The data of Table I was computed from a series of tests run according to the operating parameters set out in Table II.

In the foregoing table the short outs were due to too much operator pressure on the torch and arc breaks due to too little operator pressure on the torch. For the thinner coating thickness the welding operator can influence overall performance in these two categories, although arc restrike was not a problem. An optimum coating is approximately 0.0265 inch.

All of the electrodes were subjected to tests according to standard United States Navy tests set forth in specification MIL E17764B of Apr. 28, 1959 and were found to be acceptable. The pertinent portions of the specification are as follows:

3.5.1 Operating characteristics shall remain unaffected when subjected to the salt water pressure immersion test specified in 4.4.1.1 . . . .

4.4 Test Procedures.

4.4.1 Usability. The usability of the electrodes shall be determined by making cuts underwater at a depth not greater than 10 feet on medium steel plates of ¼, ½, and 1 inch in thickness. Using both alternating and direct current, and the operating values specified in table I, the minimum rate of actual cutting and the maximum burnoff rate shall be as specified in table I.

4.4.1.1 The electrode shall be immersed in salt water under a pressure of 100 pounds per square inch for a period of 4 hours and subsequently dried in an oven at a temperature of 90° Fahrenheit (F.) for a period of 2 hours to determine compliance with 3.5.1.

CHARACTERISTICS FOR DETERMINING USABILITY

| THICKNESS OF PLATE | CURRENT | VOLTAGE | OXYGEN PRESSURE | CUTTING RATE INCHES PER MINUTE | BURN-OFF RATE LINEAR INCHES OF PLATE CUT PER LINEAR INCH OF ELECTRODE CONSUMED |
|---|---|---|---|---|---|
| INCH | AMPERES | VOLTS | POUNDS PER SQUARE INCH | MINIMUM | MINIMUM |
| ¼ | 300 | 37 – 40 | 20 | 20 | 1½ |
| ½ | 300 | 37 – 40 | 30 | 18 | 1 |
| 1 | 300 | 37 – 40 | 50 | 15 | ¾ |

TABLE II

| Plate Thickness (In.) | Current (amps) | Voltage (volts) | Oxygen Pressure (psi) | Cutting[1] Rate (Minimum) | Burn[2] Off-Rate (Minimum) |
|---|---|---|---|---|---|
| ¼ | 300 | 37–40 | 20 | 20 | 1½ |
| ½ | 300 | 37–40 | 30 | 18 | 1 |
| 1 | 300 | 37–40 | 50 | 15 | ¾ |

(1) Inches per minute
(2) Linear inches of plate cut per linear inch of electrode consumed The full test results from which the data of Table I was extracted is as set out in Table III.

TABLE III

| Test | Dia.* Electrode In. | Electrode Burn-off In. | Length of Cut-In. | Arc Time Min. | In. of Cut Per In. of Electrode | In. of Cut Per Minute | No. of Short Outs | No. Arc Breaks |
|---|---|---|---|---|---|---|---|---|
| 1 | .335 | 9.75 | 13.625 | .60 | 1.40 | 22.8 | 12 | 8 |
| 2 | .335 | 9.75 | 15.75 | .40 | 1.615 | 39.4 | 4 | 6 |
| 3 | .345 | 7.5 | 12.50 | .15 | 1.67 | 83.3 | 1 | 18 |
| 4 | .345 | 8.0 | 13.375 | .20 | 1.67 | 66.8 | 0 | 15 |
| 5 | .355 | 7.875 | 14.25 | .25 | 1.81 | 57.0 | 1 | 8 |
| 6 | .355 | 8.25 | 13.375 | .20 | 1.62 | 66.8 | 1 | 10 |
| 7 | .365 | 9.44 | 13.50 | .25 | 1.43 | 54.0 | 4 | 5 |
| 8 | .365 | 9.375 | 13.625 | .25 | 1.45 | 54.5 | 0 | 0 |
| 9 | Standard | 11.875 | 13.25 | .50 | 1.12 | 26.5 | 1 | 2 |
| 10 | Standard | 10.25 | 13.75 | .40 | 1.34 | 34.4 | 1 | 1 |
| 11 | .365 | 10.125 | 15.00 | .20 | 1.34 | 75.0 | 3 | 2 |
| 12 | .355 | 11.5 | 19.00 | .50 | 1.65 | 38.0 | 2 | 1 |

*Nominal diameter of the uncoated substrate was 0.312"

This specification is standard for all electrodes sold to the United States Navy for underwater cutting electrodes.

The electrodes coated with the epoxy resin were found to be highly abrasion resistant so that during use, if the electrode is struck along its length on a sharp object, the coating will not crack and expose the operator to electrical shock or the electrode to arcing.

It is also contemplated that known glass, ceramic, cement, paint or synthetic plastic or resin coatings, used to protect metals against various environments, can be used to coat underwater electrodes as long as the coating is electrically insulating, abrasion resistant, waterproof, and craters the arc during use.

Having thus described my invention the following claims set forth that which is to be secured by Letters Patent of the United States.

I claim:

1. An electrode for use in electric arc cutting and welding operations underwater wherein the electrode is connected to a source of electric current and used to strike an electric arc between it and an object being cut or welded said electrode comprising in combination a generally cylindrical elongate electrically conducting substrate having a generally cylindrical bore therethrough and a cylinder wall of continuous substantially uniform cross-section; the substrate having a single unitary protective coating thereon that is waterproof by showing approximately 0.19 percent moisture absorption after immersion in water for 24 hours, electrically insulating demonstrated by a dielectric strength of between 550 and 700 volts per mil of thickness, abrasion resistant by resisting penetration or cracking after impact by a one pound ball dropped from a height of 4 feet, serves to crater the electric arc during actual cutting and welding; the electrode after being immersed in sea water under a pressure or 100 psi for 4 hours and dried at 90° for 2 hours will cut through ½-inch steel plate at an ambient oxygen pressure (gauge) of 30 pounds at a minimum rate of 18-inches per minute with an electrode consumption of 1-inch per inch of plate cut; and the coating having a minimum dielectric strength of 100 volts after immersion and drying.

2. An electrode for use in electric arc cutting and welding operations underwater comprising in combination a generally cylindrical elongate electrically conducting substrate having a generally cylindrical bore therethrough and a cylinder wall of continuous substantially uniform cross-section; the substrate being coated with a layer of pre-catalyzed thermosettable epoxy resin, the coating having a minimum dielectric strength of 100 volts after the coated electrode is immersed in sea water under pressure of 100 psi for 4 hours and then dried at 90°F for 2 hours, the coating after curing further exhibiting the following properties measured according to A.S.T.M. or equivalent standards:

a. specific gravity of 1.6;
b. hardness of 90–100 Shore D;
c. moisture absorption of about 0.19 percent after immersion in water for 24 hours;
d. a dielectric constant of about 4.45 at 77°F and $10^2$ cycles per second;
e. a volume resistivity of about $6.7 \times 10^{15}$ ohms/cms at 77°F;
f. a surface resistivity of about $2.8 \times 10^{12}$ ohms/cm² at 77°F; and
g. a dielectric strength of 550–700 volts/mill.

* * * * *